US012322153B2

(12) United States Patent
Chandra Mahato

(10) Patent No.: US 12,322,153 B2
(45) Date of Patent: Jun. 3, 2025

(54) LAYER-WISE ATTRIBUTION IMAGE ANALYSIS FOR COMPUTER VISION SYSTEMS

(71) Applicant: Accenture Global Solutions Limited, Dublin (IE)

(72) Inventor: Bikash Chandra Mahato, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 305 days.

(21) Appl. No.: 18/079,743

(22) Filed: Dec. 12, 2022

(65) Prior Publication Data
US 2024/0193912 A1 Jun. 13, 2024

(51) Int. Cl.
*G06V 10/75* (2022.01)
*G06V 10/74* (2022.01)

(52) U.S. Cl.
CPC .......... *G06V 10/761* (2022.01); *G06V 10/751* (2022.01); *G06V 2201/07* (2022.01)

(58) Field of Classification Search
CPC ............... G06V 10/761; G06V 10/751; G06V 2201/07; G06V 10/82
See application file for complete search history.

(56) References Cited

U.S. PATENT DOCUMENTS

2022/0309285 A1* 9/2022 Shelhamer ............. G06N 3/045
2024/0395023 A1* 11/2024 Lilaonitkul .......... G06V 10/776

OTHER PUBLICATIONS

Qin, Xuebin, et al. "U $\hat{0}2\$$-Net: Going Deeper with Nested U-Structure for Salient Object Detection." arXiv preprint arXiv:2005.09007 (2022).https://arxiv.org/abs/2005.09007 (Year: 2022).*
Binder, Alexander, et al. "Layer-wise Relevance Propagation for Neural Networks with Local Renormalization Layers." arXiv preprint arXiv:1604.00825 (2016).https://arxiv.org/abs/1604.00825 (Year: 2016).*

* cited by examiner

*Primary Examiner* — Xuemei G Chen
*Assistant Examiner* — Han Hoang
(74) *Attorney, Agent, or Firm* — Polsinelli PC

(57) ABSTRACT

In some implementations, an image analysis platform may receive image data for analysis. The image analysis platform may generate, using a computer vision model, an analysis of the image data, wherein the analysis comprises a plurality of layers generated from the image data. The image analysis platform may determine attributions of each layer to a prediction based on the analysis of the image data. The image analysis platform may determine structural similarities between image pairs associated with sets of layers of the plurality of layers, wherein the structural similarities are based on the attributions. The image analysis platform may analyze the structural similarities to determine an assessment of the prediction performed using the computer vision model. The image analysis platform may provide an output associated with identifying the assessment of the prediction.

20 Claims, 12 Drawing Sheets

LAYER-WISE ATTRIBUTION IMAGE ANALYSIS FOR COMPUTER VISION SYSTEMS

BACKGROUND

A device may use a computer vision system to process digital images or videos and extract information from the digital images or videos. For example, a device may perform object recognition on an image to identify one or more objects depicted by the image. In a manufacturing context, object recognition may be used for defect identification. For example, a device may use a computer vision system to attempt to determine whether a crack or scratch is present in an image of a manufactured part. In this case, the object recognition functionality of the computer vision system (e.g., a computer vision model) may be trained to identify cracks and/or cracked manufactured parts. Based on using the device to determine whether a crack is present, the device can reject a manufactured part as defective or pass a manufactured part as suitable for shipping to a customer. Similarly, in a medical context, a device may use a computer vision system to attempt to determine a diagnosis based on imaging of a patient. In this case, the object recognition functionality of the computer vision system may be trained to identify types of tissue that may be present in a scan of a patient. Based recognizing a type of tissue as an "object" in an image, the device can suggest a diagnosis for the patient.

SUMMARY

Some implementations described herein relate to a method. The method may include receiving, by an image analysis platform, image data for analysis. The method may include generating, by the image analysis platform and using a computer vision model, an analysis of the image data, where the analysis comprises a plurality of layers generated from a pixel level attribution of the image data at the plurality of layers of the computer vision model. The method may include determining, by the image analysis platform, attributions of each layer to a prediction based on the analysis of the image data. The method may include determining, by the image analysis platform, structural similarities between image pairs associated with sets of layers of the plurality of layers, where the structural similarities are calculated based on the attribution. The method may include analyzing, by the image analysis platform, the structural similarities to determine an assessment of the prediction performed using the computer vision model. The method may include providing, by the image analysis platform, an output associated with identifying the assessment of the prediction.

Some implementations described herein relate to a device. The device may include one or more memories and one or more processors communicatively coupled to the one or more memories. The device may be configured to receive image data for analysis. The device may be configured to generate, using a computer vision model, an analysis of the image data. The device may be configured to determine attributions of each layer to a prediction based on the analysis of the image data. The device may be configured to determine structural similarities between image pairs associated with sets of layers of the plurality of layers. The device may be configured to analyze the structural similarities to determine an assessment of the prediction performed using the computer vision model. The device may be configured to provide a user interface associated with identifying the assessment of the prediction. The device may be configured to receive, via the user interface, input associated with the attributions. The device may be configured to regenerate the analysis of the image data based on the input.

Some implementations described herein relate to a non-transitory computer-readable medium that stores a set of instructions for a device. The set of instructions, when executed by one or more processors of the device, may cause the device to train a computer vision model using training data. The set of instructions, when executed by one or more processors of the device, may cause the device to receive image data for analysis. The set of instructions, when executed by one or more processors of the device, may cause the device to generate, using a computer vision model, an analysis of the image data. The set of instructions, when executed by one or more processors of the device, may cause the device to determine attributions of each layer to a prediction based on the analysis of the image data. The set of instructions, when executed by one or more processors of the device, may cause the device to determine structural similarities between image pairs associated with sets of layers of the plurality of layers. The set of instructions, when executed by one or more processors of the device, may cause the device to analyze the structural similarities to determine an assessment of the prediction performed using the computer vision model. The set of instructions, when executed by one or more processors of the device, may cause the device to provide information identifying the assessment of the prediction. The set of instructions, when executed by one or more processors of the device, may cause the device to receive input associated with altering one or more parameters of the computer vision model based on providing the information identifying the assessment of the prediction. The set of instructions, when executed by one or more processors of the device, may cause the device to update the computer vision model based on the input.

DETAILED DESCRIPTION

Figure 1A:
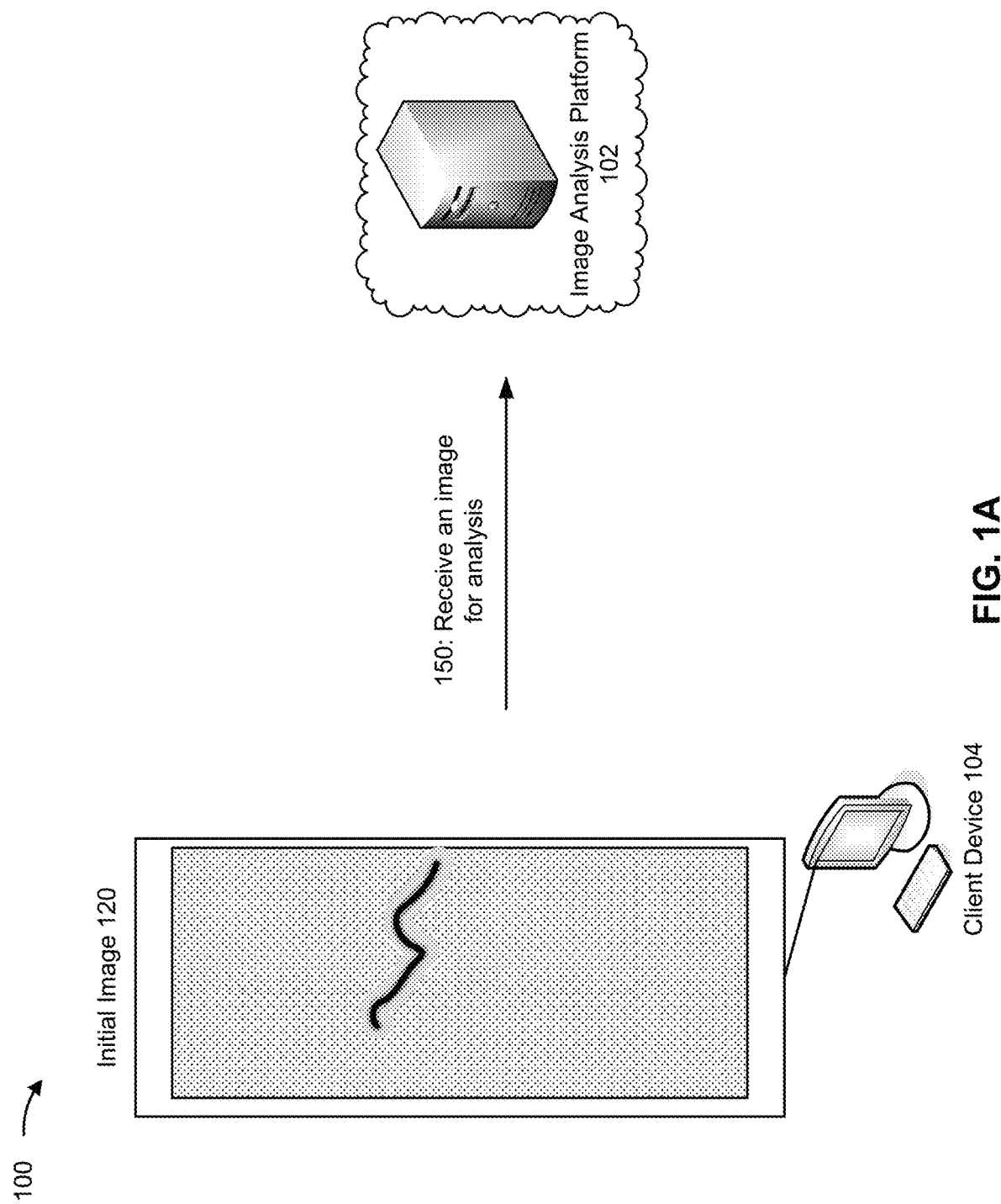
FIGS. 1A-1E are diagrams of an example implementation associated with layer-wise image analysis for computer vision systems.

The following detailed description of example implementations refers to the accompanying drawings. The same reference numbers in different drawings may identify the same or similar elements.

Some computer vision systems may use artificial intelligence (AI) techniques, such as deep learning models, to perform predictions based on input data. An AI model, such as a deep learning model, may provide a black-box type of functionality for generating a prediction. For example, a device may receive an image as input and provide a prediction as output. The prediction can be based on executing a computer vision functionality that uses a deep learning model.

Explainable AI has been introduced, in some contexts, as a technique to provide information regarding how a prediction is derived. A computing system that implements explainable AI techniques can provide, in addition to a prediction, output identifying one or more factors, in an underlying AI model, that contribute to the prediction. In other words, the computing system may identify how the prediction was derived. This may facilitate implementation of automated decision-making processes by ensuring trust and transparency in such processes. Moreover, in some cases, explainable AI may be a design requirement of an AI system as part of a requirements gathering process or a legal compliance process. For example, in order for an AI system to be deployed and automate a process, the AI system may need to provide certification that the AI system is not generating predictions based on biases, overfitting of training data, or other possible sources of error in generating the predictions.

In computer vision AI, explainable AI solutions may derive a pixel-wise attribution that enables a device to output information identifying which pixels of an image were most relevant to generating a prediction. In other words, when a system identifies an object in an image, the system may output information identifying the object and information indicating which pixels the system identified as being part of the object. This may enable troubleshooting of errors in computer vision. For example, in a training data set for identifying an animal using computer vision, a deep learning model may "learn" that the animal was present in all images that included a certain type of tree. While this may be "true" within the training data, when the deep learning model is applied to new images that include the animal, but do not include the tree, the deep learning model may not predict the animal is present when the tree is not included in the new images, and may incorrectly predict that the animal is present when the tree is included, but the animal is not included in the new images. Accordingly, an explainable AI solution may result in outputting information identifying pixels of a tree (or the lack thereof) as being most relevant to a prediction, which may enable identification of the aforementioned learning error and retraining of the deep learning model.

However, some advanced computer vision solutions use a deep learning model where an image can be analyzed at tens, hundreds, or even thousands of different layers with different sets of pixels at each layer. Accordingly, providing pixel-wise attribution is limited in how much explainability is provided as output. When the level of explainability is limited, a device may not be able to be certified as meeting requirements or in legal compliance. Moreover, when a model makes an inaccurate prediction, it may be difficult to identify how to fix or retrain the model when there is limited explainability. It may be desirable to provide enhanced explainability for computer vision systems, thereby enabling broader deployment as well as improved model training and retraining, which can increase an overall accuracy of a model.

Some implementations described herein enable an image analysis platform to perform layer-wise attribution image analysis and fuse attributions of multiple layers to provide an assessment of a prediction generated using the image analysis platform. The layer-wise attribution image analysis may include an analysis of pixel attributions generated at each layer of a deep learning model. For example, the image analysis platform may use a deep learning model to generate a prediction for an input image, may determine attributions of each layer generated from the input image, compare a structural similarity of attribution image pairs based on the attributions of each layer, and generate a fused attribution based on the structural similarity of the attribution image pairs. Structural similarities between each pair of attribution images are analyzed collectively to derive the most important layers (e.g., that contribute most strongly towards the model prediction). In this way, the image analysis platform enables improved explainability of an output of the image analysis platform relative to a pixel-wise attribution-based explainability output. The improved explainability output enables improved training and retraining of the deep learning model, thereby improving a subsequent accuracy of predictions generated using the deep learning model. Moreover, the improved explainability output provides greater confidence and transparency in predictions generated using the deep learning model, which enables broader deployment while complying with explainability criteria. Because the deep learning model can generate predictions based on input data more accurately than a human can and/or with reduced resource utilization, such as predicting a medical diagnosis, identifying a defective part, or controlling a vehicle more accurately than a human, enabling broader deployment of image analysis platforms with deep learning models can improve, for example, health outcomes, manufacturing quality, autonomous vehicle safety, or other fields where image analysis accuracy is critical.

FIGS. 1A-1E are diagrams of an example implementation 100 associated with layer-wise attribution image analysis for computer vision systems. For example, diagrams of example implementation 100 are associated with an analysis of pixel attributions generated at each layer of a deep learning model. As shown in FIG. 1A, example implementation 100 includes an image analysis platform 102 and a client device 104. These devices are described in more detail below in connection with FIG. 4 and FIG. 5.

As further shown in FIG. 1A, and by reference number 150, the image analysis platform 102 may receive image data for analysis. For example, the image analysis platform 102 may receive initial image 120 from the client device 104. In this case, as shown, the initial image 120 is of a manufacturing part with a crack present (e.g., with the analysis being to detect whether a crack is present). In some implementations, the image analysis platform 102 may receive a set of images as training data for training a model before receiving image data for analysis. For example, the image analysis platform 102 may receive training data include a set of images and may train a deep learning model to perform object recognition, segmentation, and/or prediction on subsequent images for analysis. Additional details regarding training and operation of a model, such as a deep learning model, are described with regard to FIGS. 2 and 3.

Figure 1B:
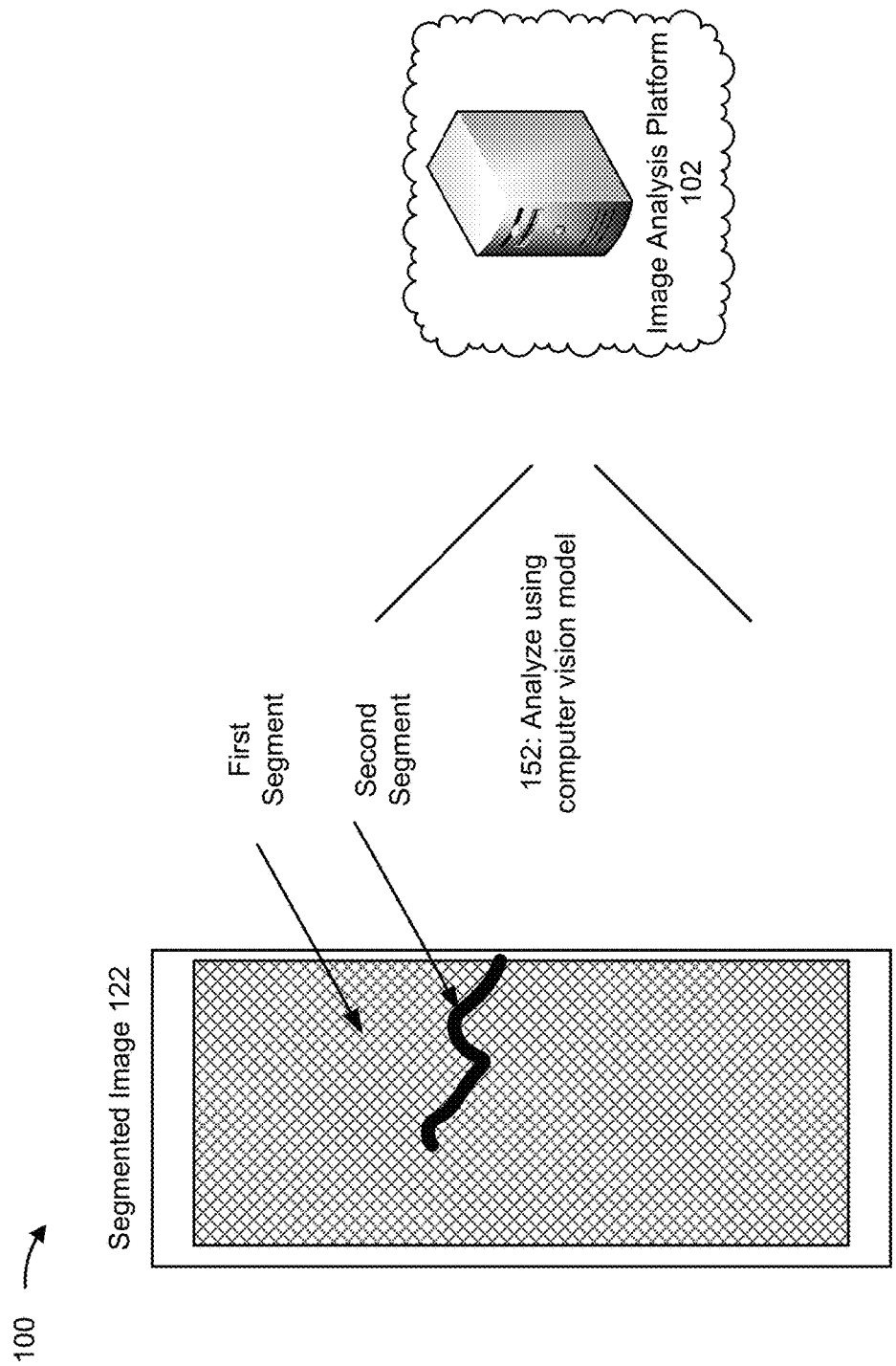

As shown in FIG. 1B, and by reference number 152, the image analysis platform 102 may analyze the image using a computer vision model, such as a deep learning model. For example, the image analysis platform 102 may identify an object in the initial image 120 (e.g., identify that a crack is present in the initial image 120) and/or generate a prediction based on the image (e.g., a prediction that a crack is present) using the computer vision model. In some implementations, the image analysis platform 102 may segment the image to analyze the image using the computer vision model. For example, the image analysis platform 102 may use a deep learning model, which may have an encoder/decoder architecture, to segment the image into different segments representing different aspects of the input image. As further shown in FIG. 1B, in one example, a segmented image 122 may include a first segment representing a background of the initial image 120 and a second segment representing a feature identified in the initial image 120. In this case, the feature may be a crack or scratch that is predicted, using the computer vision model, to be present on a part.

In some implementations, the image analysis platform 102 may generate a set of layers of the image to analyze the image. For example, the image analysis platform 102 may use an encoder to encode the image into feature representations at multiple levels. Each level may apply convolution blocks and maxpooling down-sampling. For example, the image analysis platform 102 may generate a first layer with a first set of pixels (e.g., a first pixel size), a second layer with a second set of pixels (e.g., a second pixel size), and an n-th layer with an n-th set of pixels (e.g., an n-th pixels size). In this case, the image analysis platform 102 can analyze each pixel to generate a prediction, where different pixels in different layers have different sizes covering different portions of the initial image 120.

Based on encoding the image into the feature representations, the encoder of the image analysis platform 102 and the computer vision model thereof may learn discriminative features. The image analysis platform 102 may use a decoder (e.g., corresponding to the encoder) to semantically project the discriminative features (e.g., at a first resolution that is a relatively low resolution), learned by the encoder, into pixel space (e.g., at a second resolution that is a relatively high resolution) to obtain a dense classification. The image analysis platform 102 may transform attributions generated at different layers into a common image size (e.g., the original image size) to perform a comparison between the attributions generated at the different layers. Attributions at each layer may be referred to as "attribution images." Attribution images generated at different layers have different spatial dimensions, but are converted into a common spatial dimension to enable comparison between attributions associated with pixels of the different attribution images. Accordingly, the image analysis platform 102 converts the different attribution images (e.g., images representing each layer of the original image) to have a common spatial dimension to enable calculation of structural similarity, as described herein.

Figure 1C:
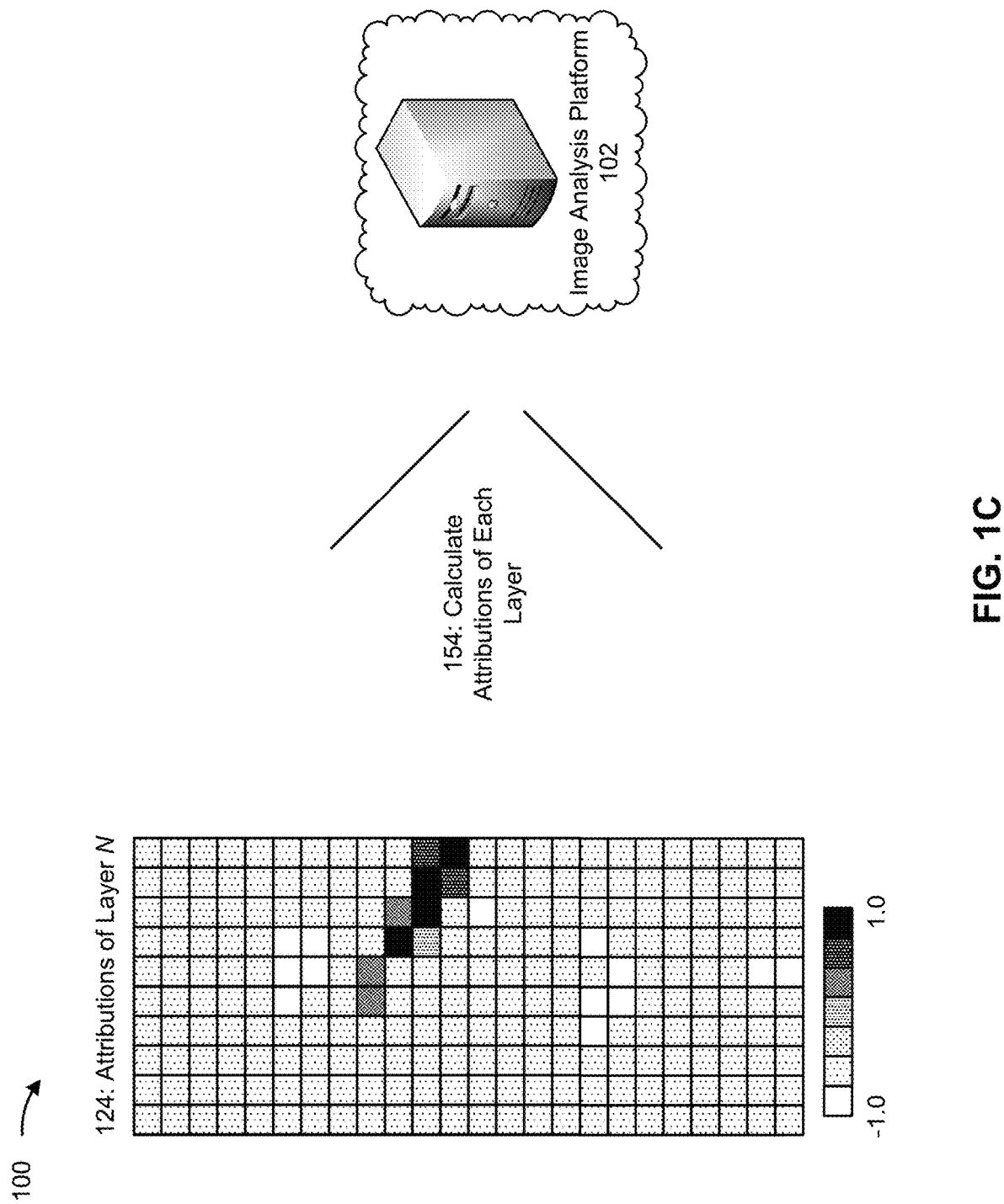

As shown in FIG. 1C, and by reference number 154, the image analysis platform 102 may calculate the attributions of each layer. For example, the image analysis platform 102 may determine a metric associated with identifying an extent to which a layer contributed to a prediction or other output associated with the image. As shown, attributions 124 for a layer N of a deep learning model being used to process the initial image 120 may have attributions of pixels ranging from −1.0 to 1.0. In this case, where 1.0 represents a strong or positive attribution of a pixel to a prediction and −1.0 represents a weak or negative attribution of a pixel to a prediction. Other ranges, including dynamic ranges based on a gradient calculation, are contemplated. As shown, areas proximate to the predicted crack are associated with relatively high attribution values for layer N and areas farther from the predicted crack are associated with relatively low attribution values for layer N. The structural similarity is calculated between each pair of images representing pixel attributions at various layers of the deep learning model. The structural similarity ranges from −1.0 to 1.0, where 1.0 represents a strong or positive correlation between two attribution images associated with two layers and −1.0 represents a weak or negative correlation. The attribution layers having stronger correlations are selected fused to produce a final attribution image that represents a reasoning for the model prediction.

In some implementations, the image analysis platform 102 may use a particular technique for calculating the attributions of each layer. For example, the image analysis platform 102 may use gradient-weighted class activation mapping (Grad-CAM) for calculating the attributions of each layer. When using Grad-CAM (or another technique), the image analysis platform 102 determines a gradient as a classification score with respect to convolutional features determined by the encoder of the deep learning model being applied by the image analysis platform 102. In this case, when the image analysis platform 102 determines that the image indicates that a part, which was imaged, has a crack, the image analysis platform 102 may determine an extent to which each layer influenced the prediction or recognition that the part has the crack.

Figure 1D:
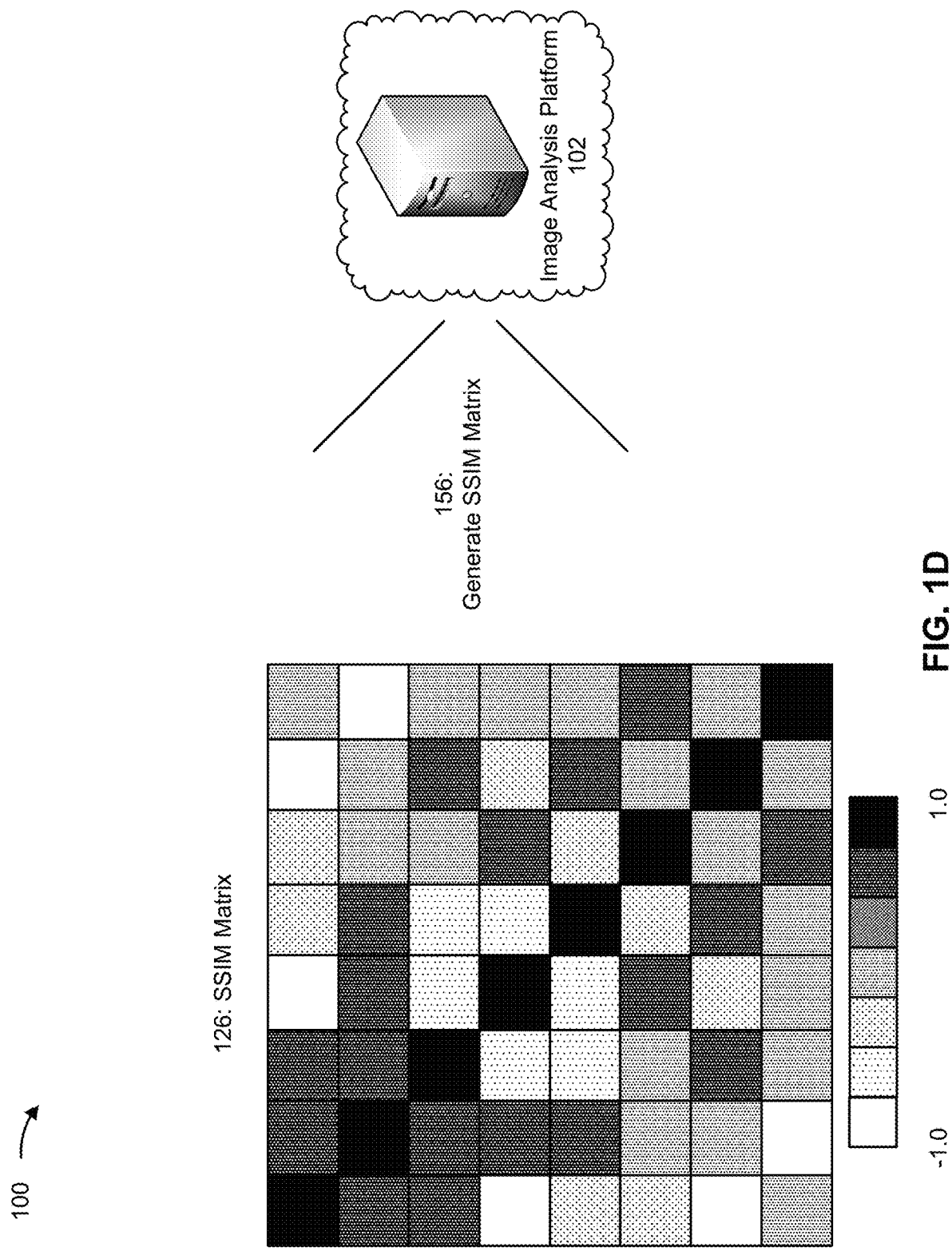

As shown in FIG. 1D, and by reference number 156, the image analysis platform 102 may generate a structural similarity (SSIM) matrix 126. For example, the image analysis platform 102 may compare pairs of images representing pairs of layers generated at various layers of the deep learning model applied to the image and generate the SSIM matrix 126 to represent a result of comparing the pairs of images. As shown, in one example, the SSIM matrix 126 may vary from 1.0 to −1.0, where 1.0 indicates that an image pair includes two attribution images that are the same (e.g., the attributions of the two images are the same) and −1.0 represents that an image pair includes two attribution images that are entirely different (e.g., the attributions of the two images are inverse values). The SSIM matrix 126 may have entries representing structural similarities for each possible pair of attribution images. The SSIM matrix 126 may be an N×N matrix, where N represents a quantity of hidden layers and associated attribution images generated in the computer vision model (e.g., the deep learning model) to analyze the initial image 120.

Figure 1E:
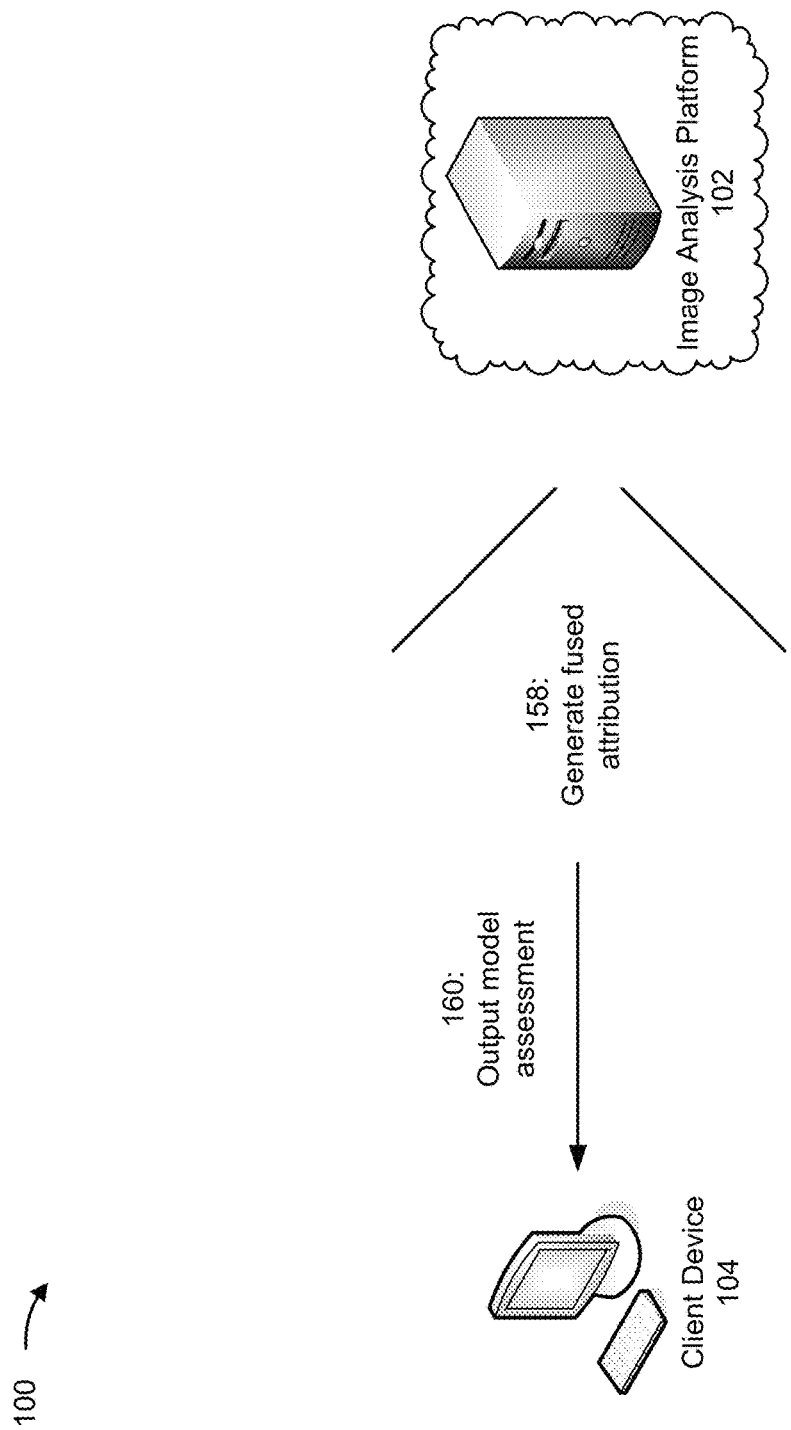

As shown in FIG. 1E, and by reference number 158, the image analysis platform 102 may generate a fused attribution. For example, the image analysis platform 102 may identify similar attribution image pairs among the layers generated in the deep learning model (e.g., at the decoder). The image analysis platform 102 may identify a starting index of a decoder layer from the deep learning model. A last layer of the decoder (e.g., a segmentation head) may be associated with the most relevant attributions from segmentation of the original image. Accordingly, the image analysis platform 102 identifies one or more other layers of the decoder that are most similar to the last layer of the decoder in terms of pixel attributions. The image analysis platform 102 may identify the most similar one or more other layers by deriving all possible pairs of attribution layers having an SSIM value that satisfies a threshold. Based on the aforementioned analysis, the image analysis platform 102 may identify a set of layers in the decoder that are classified as being highly correlated to the prediction performed using the deep learning model and/or a set of layers having a higher SSIM value than a threshold when compared with the last layer of the decoder. The image analysis platform 102 may fuse the set of layers associated with SSIM values that exceed the threshold to generate a fused attribution image.

As further shown in FIG. 1E, and by reference number 160, the image analysis platform 102 may output a model assessment. For example, the image analysis platform 102 may transmit the model assessment to the client device 104.

In some implementations, the image analysis platform 102 may output information identifying the fused attribution image. For example, the image analysis platform 102 may include information identifying set of layers contributing the fused attribution image and may provide the fused attribution image for display (e.g., via the client device 104). This may indicate which portions of the image contributed most strongly to a prediction generated regarding the original image. Additionally, or alternatively, the image analysis platform 102 may provide information identifying one or more attribution images associated with layers that do not satisfy a threshold level of structural similarity to a layer most correlating to the prediction. For example, the image analysis platform 102 may indicate that a structural similarity for some layers is negative, which may indicate a lower degree of confidence in an accuracy of a prediction using the deep learning model.

In some implementations, the image analysis platform 102 may automatically retrain the deep learning model. For example, when a structural similarity does not satisfy one or more threshold criteria, the image analysis platform 102 may obtain additional training data (e.g., additional images) and retrain the deep learning model to attempt to improve an accuracy of predictions using the deep learning model. Additionally, or alternatively, the image analysis platform 102 may request that a part associated with the original image be manually checked for, in the example described herein, a crack. Based on the manual inspection, the image analysis platform 102 may receive feedback (e.g., that the prediction was correct or incorrect) that the image analysis platform 102 can use to retrain the deep learning model.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
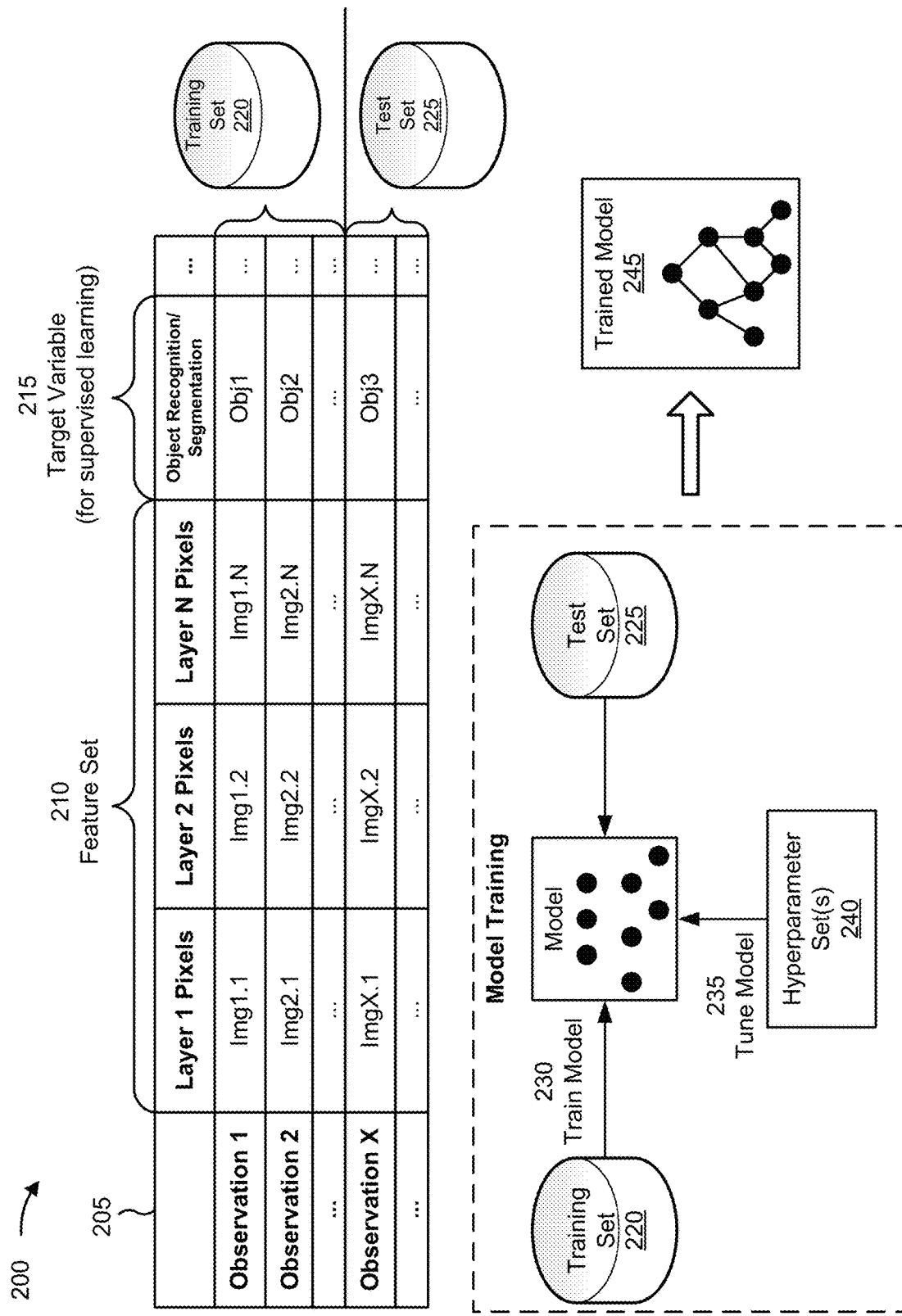
FIG. 2 is a diagram illustrating an example of training a machine learning model in connection with layer-wise attribution image analysis for computer vision systems.

FIG. 2 is a diagram illustrating an example 200 of training a machine learning model in connection with layer-wise attribution image analysis for computer vision systems. The machine learning model training described herein may be performed using a machine learning system. The machine learning system may include or may be included in a computing device, a server, a cloud computing environment, or the like, such as image analysis platform 401 described in more detail below.

As shown by reference number 205, a machine learning model may be trained using a set of observations. The set of observations may be obtained and/or input from training data (e.g., historical data), such as data gathered during one or more processes described herein. For example, the set of observations may include data gathered from an image source device 430, as described elsewhere herein. In some implementations, the machine learning system may receive the set of observations (e.g., as input) from the image source device 430.

As shown by reference number 210, a feature set may be derived from the set of observations. The feature set may include a set of variables. A variable may be referred to as a feature. A specific observation may include a set of variable values corresponding to the set of variables. A set of variable values may be specific to an observation. In some cases, different observations may be associated with different sets of variable values, sometimes referred to as feature values. In some implementations, the machine learning system may determine variables for a set of observations and/or variable values for a specific observation based on input received from the image source device 430. For example, the machine learning system may identify a feature set (e.g., one or more features and/or corresponding feature values) from structured data input to the machine learning system, such as by extracting data from a particular column of a table, extracting data from a particular field of a form and/or a message, and/or extracting data received in a structured data format. Additionally, or alternatively, the machine learning system may receive input from an operator to determine features and/or feature values. In some implementations, the machine learning system may perform natural language processing and/or another feature identification technique to extract features (e.g., variables) and/or feature values (e.g., variable values) from text (e.g., unstructured data) input to the machine learning system, such as by identifying keywords and/or values associated with those keywords from the text.

As an example, a feature set for a set of observations may include a first feature of a first layer of pixels, a second feature of a second layer of pixels, an nth feature of an nth layer of pixels, and so on. As shown, for a first observation, the first feature may have a value of a first image (e.g., a layer of an image under analysis, "Img1.1"), the second feature may have a value of a second image, the nth feature may have a value of an nth image, and so on. These features and feature values are provided as examples, and may differ in other examples. For example, the feature set may include one or more of the following features: pixels within an image, a context of the image, one or more colors of the image, or a location associated with the image, among other examples. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources and/or memory resources) used to train the machine learning model.

As shown by reference number 215, the set of observations may be associated with a target variable. The target variable may represent a variable having a numeric value (e.g., an integer value or a floating point value), may represent a variable having a numeric value that falls within a range of values or has some discrete possible values, may represent a variable that is selectable from one of multiple options (e.g., one of multiples classes, classifications, or labels), or may represent a variable having a Boolean value (e.g., 0 or 1, True or False, Yes or No), among other examples. A target variable may be associated with a target variable value, and a target variable value may be specific to an observation. In some cases, different observations may be associated with different target variable values. In example 200, the target variable is an object recognition prediction, which has a value of a particular recognized object (e.g., "Obj1") for the first observation.

The feature set and target variable described above are provided as examples, and other examples may differ from what is described above. For example, for a target variable of a defect (e.g., when using a computer vision model for defect identification in a manufacturing context), the feature set may include image layers, a type of product, one or more manufacturing parameters, an age of the product, or a lighting condition, among other examples.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model or a predictive model. When the target variable is associated with continuous target variable values (e.g., a range of numbers), the machine learning model may employ a regression technique. When the target variable is associated with categorical target variable values (e.g., classes or labels), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, or an automated signal extraction model. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 220 that may include a first subset of observations, of the set of observations, and a test set 225 that may include a second subset of observations of the set of observations. The training set 220 may be used to train (e.g., fit or tune) the machine learning model, while the test set 225 may be used to evaluate a machine learning model that is trained using the training set 220. For example, for supervised learning, the test set 225 may be used for initial model training using the first subset of observations, and the test set 225 may be used to test whether the trained model accurately predicts target variables in the second subset of observations. In some implementations, the machine learning system may partition the set of observations into the training set 220 and the test set 225 by including a first portion or a first percentage of the set of observations in the training set 220 (e.g., 75%, 80%, or 85%, among other examples) and including a second portion or a second percentage of the set of observations in the test set 225 (e.g., 25%, 20%, or 15%, among other examples). In some implementations, the machine learning system may randomly select observations to be included in the training set 220 and/or the test set 225.

As shown by reference number 230, the machine learning system may train a machine learning model using the training set 220. This training may include executing, by the machine learning system, a machine learning algorithm to determine a set of model parameters based on the training set 220. In some implementations, the machine learning algorithm may include a regression algorithm (e.g., linear regression or logistic regression), which may include a regularized regression algorithm (e.g., Lasso regression, Ridge regression, or Elastic-Net regression). Additionally, or alternatively, the machine learning algorithm may include a decision tree algorithm, which may include a tree ensemble algorithm (e.g., generated using bagging and/or boosting), a random forest algorithm, or a boosted trees algorithm. A model parameter may include an attribute of a machine learning model that is learned from data input into the model (e.g., the training set 220). For example, for a regression algorithm, a model parameter may include a regression coefficient (e.g., a weight). For a decision tree algorithm, a model parameter may include a decision tree split location, as an example.

As shown by reference number 235, the machine learning system may use one or more hyperparameter sets 240 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm may include a strength (e.g., a weight) of a penalty applied to a regression coefficient to mitigate overfitting of the machine learning model to the training set 220. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

To train a machine learning model, the machine learning system may identify a set of machine learning algorithms to be trained (e.g., based on operator input that identifies the one or more machine learning algorithms and/or based on random selection of a set of machine learning algorithms), and may train the set of machine learning algorithms (e.g., independently for each machine learning algorithm in the set) using the training set 220. The machine learning system may tune each machine learning algorithm using one or more hyperparameter sets 240 (e.g., based on operator input that identifies hyperparameter sets 240 to be used and/or based on randomly generating hyperparameter values). The machine learning system may train a particular machine learning model using a specific machine learning algorithm and a corresponding hyperparameter set 240. In some implementations, the machine learning system may train multiple machine learning models to generate a set of model parameters for each machine learning model, where each machine learning model corresponds to a different combination of a machine learning algorithm and a hyperparameter set 240 for that machine learning algorithm.

In some implementations, the machine learning system may perform cross-validation when training a machine learning model. Cross validation can be used to obtain a reliable estimate of machine learning model performance using only the training set 220, and without using the test set 225, such as by splitting the training set 220 into a number of groups (e.g., based on operator input that identifies the number of groups and/or based on randomly selecting a number of groups) and using those groups to estimate model performance. For example, using k-fold cross-validation, observations in the training set 220 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k-1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, or a standard error across cross-validation scores.

In some implementations, the machine learning system may perform cross-validation when training a machine learning model by splitting the training set into a number of groups (e.g., based on operator input that identifies the number of groups and/or based on randomly selecting a number of groups). The machine learning system may perform multiple training procedures and may generate a cross-validation score for each training procedure. The machine learning system may generate an overall cross-validation score for each hyperparameter set 240 associated with a particular machine learning algorithm. The machine learning system may compare the overall cross-validation scores for different hyperparameter sets 240 associated with the particular machine learning algorithm, and may select the hyperparameter set 240 with the best (e.g., highest accuracy, lowest error, or closest to a desired threshold) overall cross-validation score for training the machine learning model. The machine learning system may then train the machine learning model using the selected hyperparameter set 240, without cross-validation (e.g., using all of data in the training set 220 without any hold-out groups), to generate a single machine learning model for a particular machine learning algorithm. The machine learning system may then test this machine learning model using the test set 225 to generate a performance score, such as a mean squared error (e.g., for regression), a mean absolute error (e.g., for regression), or an area under receiver operating characteristic curve (e.g., for classification). If the machine learning model performs adequately (e.g., with a performance score that satisfies a threshold), then the machine learning system may store that machine learning model as a trained machine learning model 245 to be used to analyze new observations, as described below in connection with FIG. 3.

In some implementations, the machine learning system may perform cross-validation, as described above, for multiple machine learning algorithms (e.g., independently), such as a regularized regression algorithm, different types of regularized regression algorithms, a decision tree algorithm, or different types of decision tree algorithms. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 220 (e.g., without cross-validation), and may test each machine learning model using the test set 225 to generate a corresponding performance score for each machine learning model. The machine learning model may compare the performance scores for each machine learning model, and may select the machine learning model with the best (e.g., highest accuracy, lowest error, or closest to a desired threshold) performance score as the trained machine learning model 245.

As indicated above, FIG. 2 is provided as an example. Other examples may differ from what is described in connection with FIG. 2. For example, the machine learning model may be trained using a different process than what is described in connection with FIG. 2. Additionally, or alternatively, the machine learning model may employ a different machine learning algorithm than what is described in connection with FIG. 2, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

Figure 3:
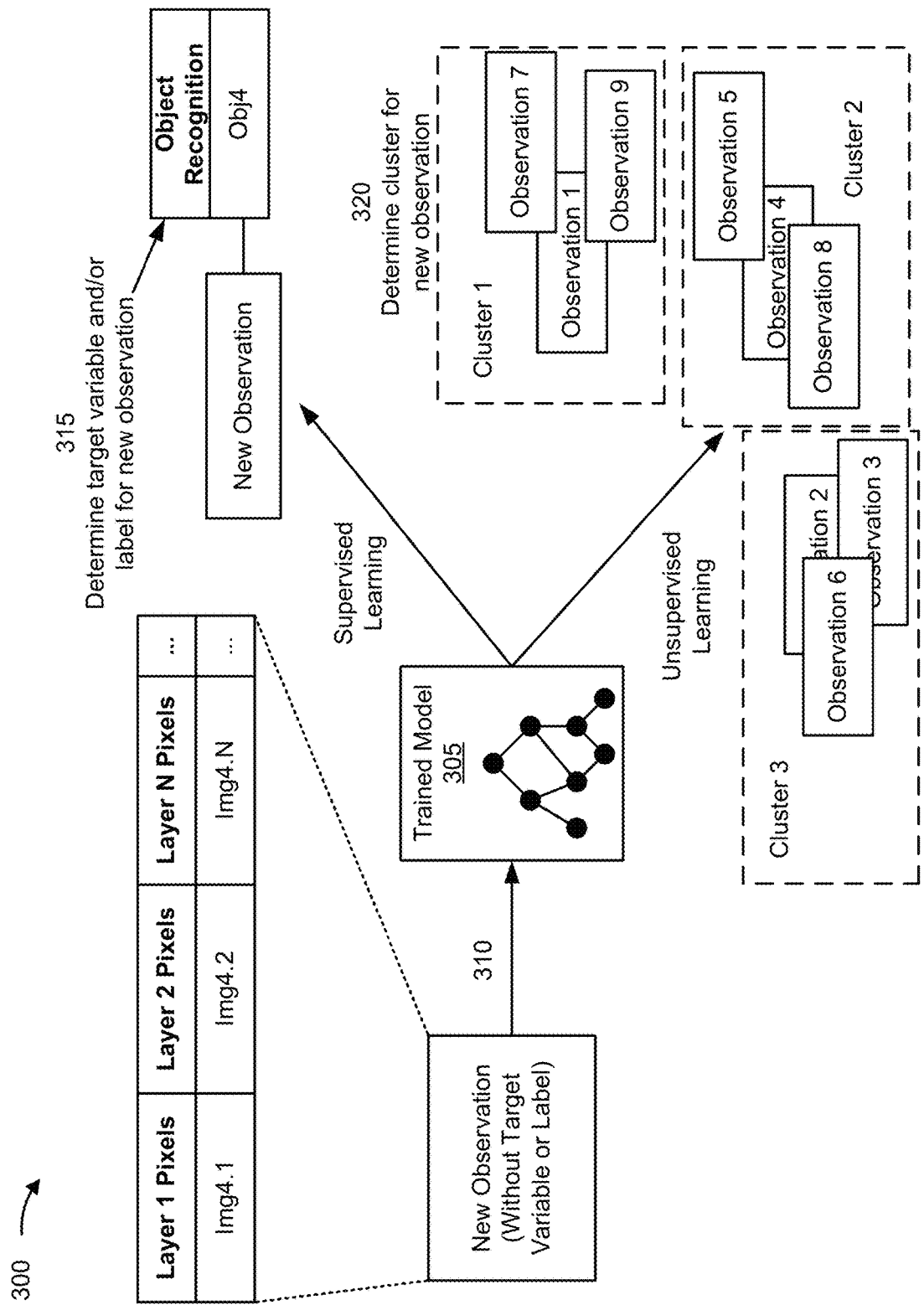
FIG. 3 is a diagram illustrating an example of applying a trained machine learning model to a new observation associated with layer-wise attribution image analysis.

FIG. 3 is a diagram illustrating an example 300 of applying a trained machine learning model to a new observation associated with layer-wise attribution image analysis. The new observation may be input to a machine learning system that stores a trained machine learning model 305. In some implementations, the trained machine learning model 305 may be the trained machine learning model 245 described above in connection with FIG. 2. The machine learning system may include or may be included in a computing device, a server, or a cloud computing environment, such as image analysis platform 401.

As shown by reference number 310, the machine learning system may receive a new observation (or a set of new observations), and may input the new observation to the machine learning model 305. As shown, the new observation may include a first feature of a first layer of an image, a second feature of a second layer of an image, a third feature of a third layer of an image, and so on, as an example. The machine learning system may apply the trained machine learning model 305 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, or a classification), such as when supervised learning is employed. Additionally, or alternatively, the output may include information that identifies a cluster to which the new observation belongs and/or information that indicates a degree of similarity between the new observation and one or more prior observations (e.g., which may have previously been new observations input to the machine learning model and/or observations used to train the machine learning model), such as when unsupervised learning is employed.

In some implementations, the trained machine learning model 305 may predict a value of a particular identified object for the target variable of an object recognition for the new observation, as shown by reference number 315. Based on this prediction (e.g., based on the value having a particular label or classification or based on the value satisfying or failing to satisfy a threshold), the machine learning system may provide a recommendation and/or output for determination of a recommendation, such as rejecting a manufactured article based on the object recognition. Additionally, or alternatively, the machine learning system may perform an automated action and/or may cause an automated action to be performed (e.g., by instructing another device to perform the automated action), such as retraining of the machine learning model 305. In some implementations, the recommendation and/or the automated action may be based on the target variable value having a particular label (e.g., classification or categorization) and/or may be based on whether the target variable value satisfies one or more threshold (e.g., whether the target variable value is greater than a threshold, is less than a threshold, is equal to a threshold, or falls within a range of threshold values).

In some implementations, the trained machine learning model 305 may classify (e.g., cluster) the new observation in a cluster, as shown by reference number 320. The observations within a cluster may have a threshold degree of similarity. As an example, if the machine learning system classifies the new observation in a first cluster (e.g., a particular class of object), then the machine learning system may provide a first recommendation, such as the recommendation described above. Additionally, or alternatively, the machine learning system may perform a first automated action and/or may cause a first automated action to be performed (e.g., by instructing another device to perform the automated action) based on classifying the new observation in the first cluster.

The recommendations, actions, and clusters described above are provided as examples, and other examples may differ from what is described above. For example, the recommendations associated with defect detection may include marking an object as defective or manufacturing a new object. The actions associated with defect detection may include, for example, automatically manufacturing a replacement object. In another example, when the machine learning system is configured to determine an attribution of each layer to a prediction performed with the machine learning system, as described above, the machine learning system may provide the attribution as output and/or may automatically retrain the machine learning system or reconfigure the machine learning system based on the attributions generated as part of providing explainability for the machine learning system.

In this way, the machine learning system may apply a rigorous and automated process to computer vision and/or layer-wise attribution image analysis of an output of a computer vision system (e.g., a layer-wise analysis of attribution images at various layers of a deep learning mode). The machine learning system may enable recognition and/or identification of tens, hundreds, thousands, or millions of features and/or feature values for tens, hundreds, thousands, or millions of observations, thereby increasing accuracy and consistency and reducing delay associated with performing object recognition using a computer vision system and/or configuring the computer vision system relative to requiring computing resources to be allocated for tens, hundreds, or thousands of operators to manually analyzing layers of an image used for a computer vision system using the features or feature values.

As indicated above, FIG. 3 is provided as an example. Other examples may differ from what is described in connection with FIG. 3.

Figure 4:
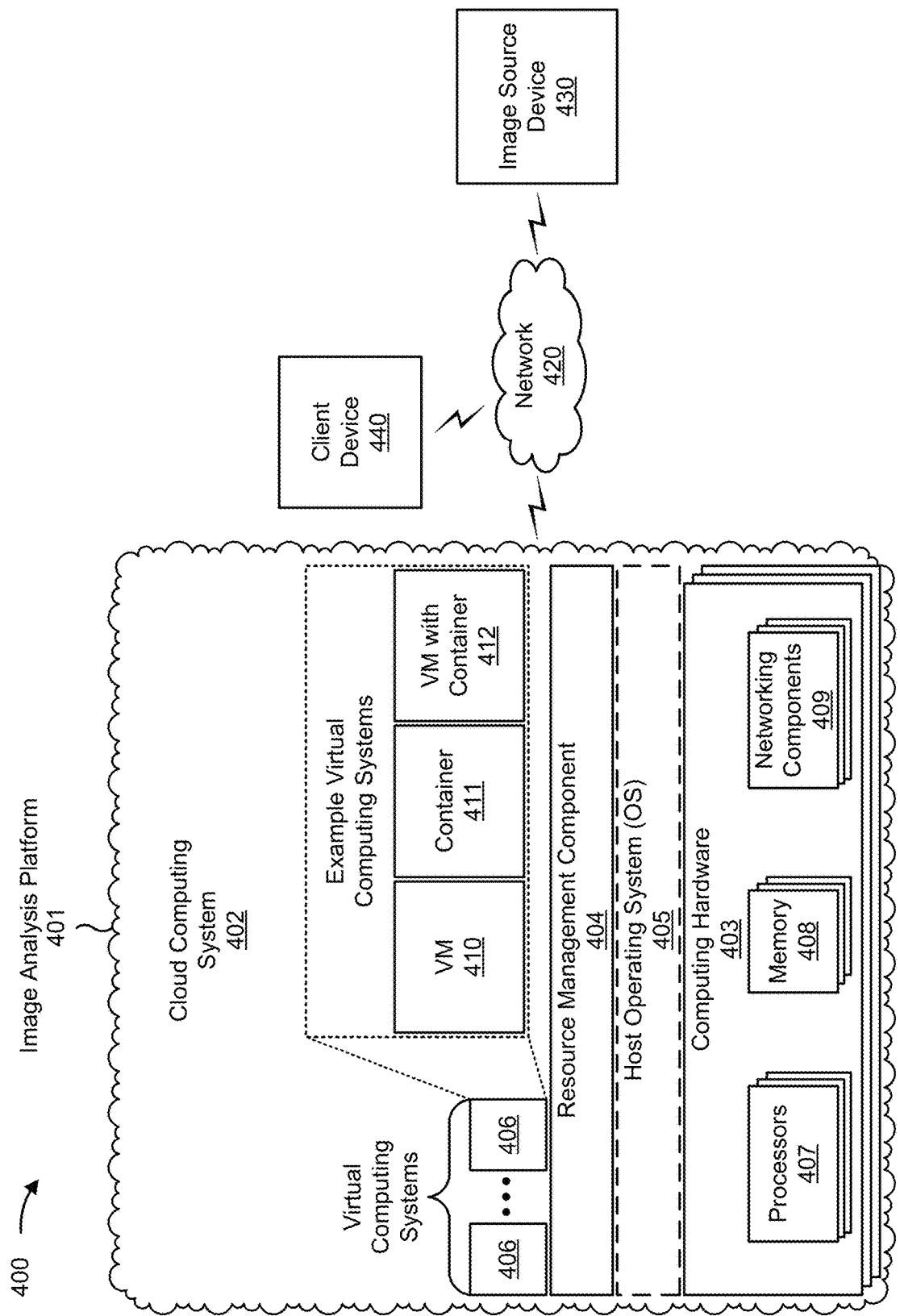
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a image analysis platform 401, which may include one or more elements of and/or may execute within a cloud computing system 402. The cloud computing system 402 may include one or more elements 403-412, as described in more detail below. As further shown in FIG. 4, environment 400 may include a network 420, an image source device 430, and/or a client device 440. Devices and/or elements of environment 400 may interconnect via wired connections and/or wireless connections.

The cloud computing system 402 may include computing hardware 403, a resource management component 404, a host operating system (OS) 405, and/or one or more virtual computing systems 406. The cloud computing system 402 may execute on, for example, an Amazon Web Services platform, a Microsoft Azure platform, or a Snowflake platform. The resource management component 404 may perform virtualization (e.g., abstraction) of computing hardware 403 to create the one or more virtual computing systems 406. Using virtualization, the resource management component 404 enables a single computing device (e.g., a computer or a server) to operate like multiple computing devices, such as by creating multiple isolated virtual computing systems 406 from computing hardware 403 of the single computing device. In this way, computing hardware 403 can operate more efficiently, with lower power consumption, higher reliability, higher availability, higher utilization, greater flexibility, and lower cost than using separate computing devices.

The computing hardware 403 may include hardware and corresponding resources from one or more computing devices. For example, computing hardware 403 may include hardware from a single computing device (e.g., a single server) or from multiple computing devices (e.g., multiple servers), such as multiple computing devices in one or more data centers. As shown, computing hardware 403 may include one or more processors 407, one or more memories 408, and/or one or more networking components 409. Examples of a processor, a memory, and a networking component (e.g., a communication component) are described elsewhere herein.

The resource management component 404 may include a virtualization application (e.g., executing on hardware, such as computing hardware 403) capable of virtualizing computing hardware 403 to start, stop, and/or manage one or more virtual computing systems 406. For example, the resource management component 404 may include a hypervisor (e.g., a bare-metal or Type 1 hypervisor, a hosted or Type 2 hypervisor, or another type of hypervisor) or a virtual machine monitor, such as when the virtual computing systems 406 are virtual machines 410. Additionally, or alternatively, the resource management component 404 may include a container manager, such as when the virtual computing systems 406 are containers 411. In some implementations, the resource management component 404 executes within and/or in coordination with a host operating system 405.

A virtual computing system 406 may include a virtual environment that enables cloud-based execution of operations and/or processes described herein using computing hardware 403. As shown, a virtual computing system 406 may include a virtual machine 410, a container 411, or a hybrid environment 412 that includes a virtual machine and a container, among other examples. A virtual computing system 406 may execute one or more applications using a file system that includes binary files, software libraries, and/or other resources required to execute applications on a guest operating system (e.g., within the virtual computing system 406) or the host operating system 405.

Although the image analysis platform 401 may include one or more elements 403-412 of the cloud computing system 402, may execute within the cloud computing system 402, and/or may be hosted within the cloud computing system 402, in some implementations, the image analysis platform 401 may not be cloud-based (e.g., may be implemented outside of a cloud computing system) or may be partially cloud-based. For example, the image analysis platform 401 may include one or more devices that are not part of the cloud computing system 402, such as device 500 of FIG. 5, which may include a standalone server or another type of computing device. The image analysis platform 401 may perform one or more operations and/or processes described in more detail elsewhere herein.

The network 420 may include one or more wired and/or wireless networks. For example, the network 420 may include a cellular network, a public land mobile network (PLMN), a local area network (LAN), a wide area network (WAN), a private network, the Internet, and/or a combination of these or other types of networks. The network 420 enables communication among the devices of the environment 400.

The image source device 430 may include one or more devices capable of receiving, generating, storing, processing, and/or providing information associated with layer-wise attribution image analysis, as described elsewhere herein. The image source device 430 may include a communication device and/or a computing device. For example, the image source device 430 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The image source device 430 may communicate with one or more other devices of environment 400, as described elsewhere herein.

The client device 440 may include one or more devices capable of receiving, generating, storing, processing, and/or providing information associated with layer-wise attribution image analysis, as described elsewhere herein. The client device 440 may include a communication device and/or a computing device. For example, the client device 440 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of the environment 400 may perform one or more functions described as being performed by another set of devices of the environment 400.

Figure 5:
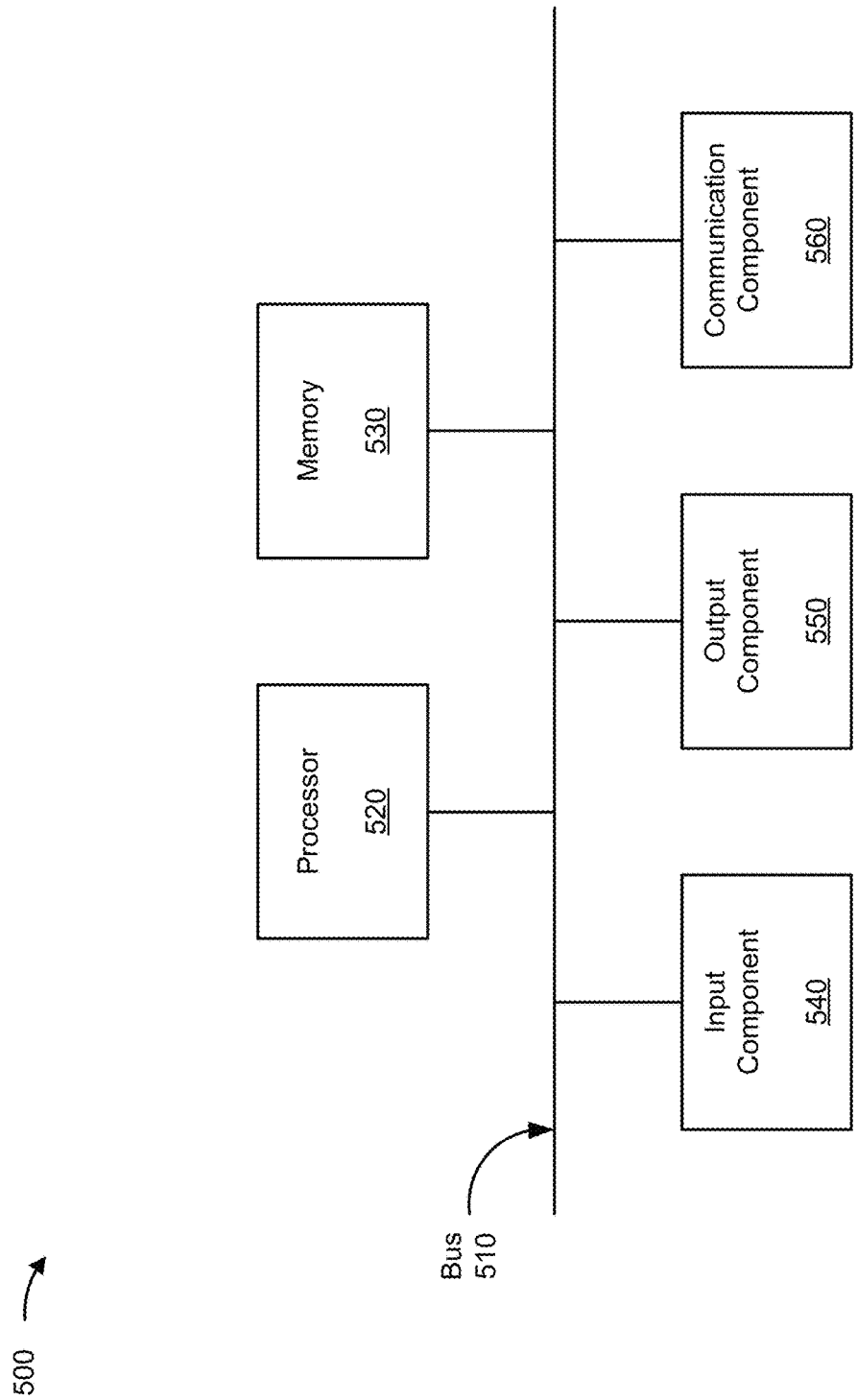
FIG. 5 is a diagram of example components of a device associated with layer-wise attribution image analysis.

FIG. 5 is a diagram of example components of a device 500 associated with layer-wise attribution image analysis. The device 500 may correspond to image analysis platform 401, image source device 430, and/or client device 440. In some implementations, image analysis platform 401, image source device 430, and/or client device 440 may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

Figure 6:
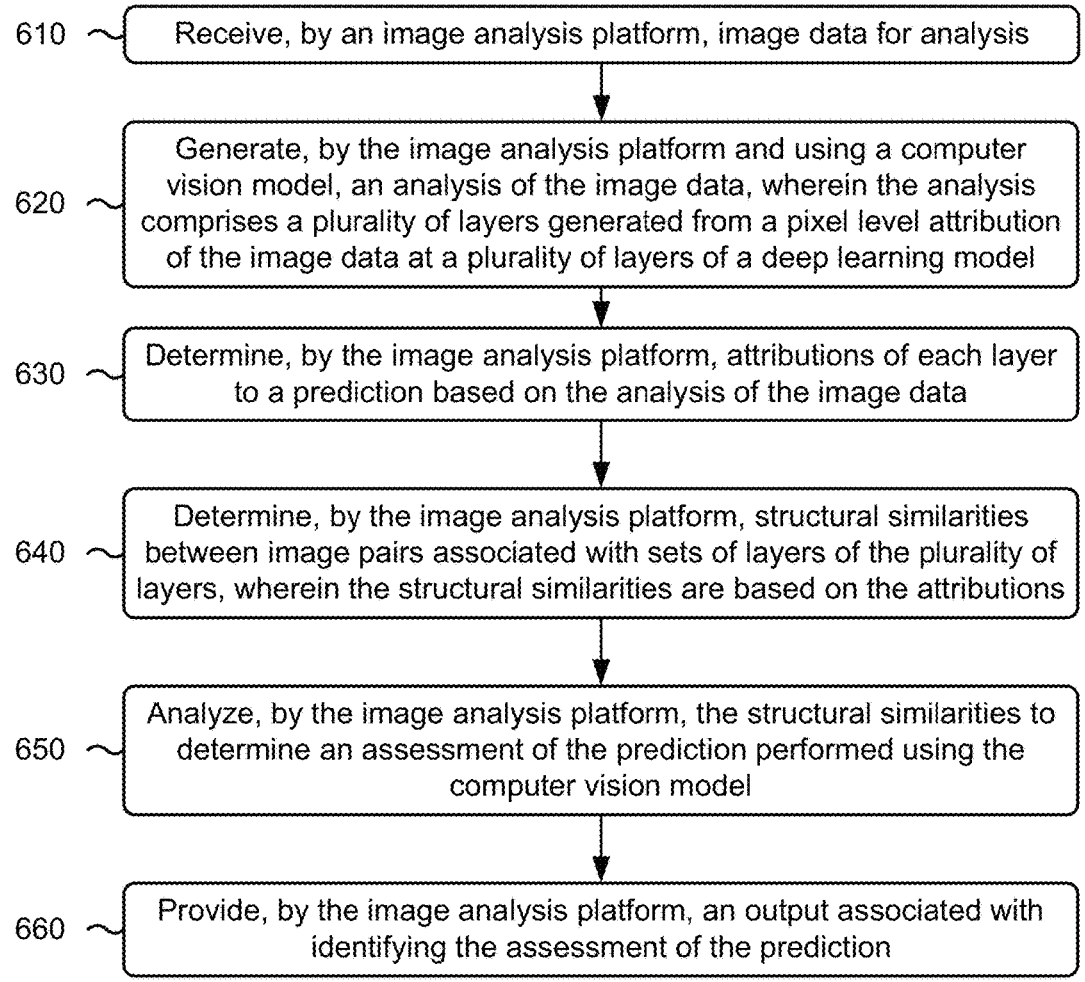
FIGS. 6-8 are flowcharts of example processes associated with layer-wise attribution image analysis.

FIG. 6 is a flowchart of an example process 600 associated with layer-wise attribution image analysis. In some implementations, one or more process blocks of FIG. 6 are performed by an image analysis platform (e.g., image analysis platform 401). In some implementations, one or more process blocks of FIG. 6 are performed by another device or a group of devices separate from or including the image analysis platform, such as an image source device (e.g., image source device 430) and/or a client device (e.g., client device 440). Additionally, or alternatively, one or more process blocks of FIG. 6 may be performed by one or more components of device 500, such as processor 520, memory 530, input component 540, output component 550, and/or communication component 560.

As shown in FIG. 6, process 600 may include receiving image data for analysis (block 610). For example, the image analysis platform may receive image data for analysis, as described above.

As further shown in FIG. 6, process 600 may include generating, using a computer vision model, an analysis of the image data, wherein the analysis comprises a plurality of layers generated from a pixel level attribution of the image data at a plurality of layers of a deep learning model (block 620). For example, the image analysis platform may generate, using a computer vision model, an analysis of the image data, wherein the analysis comprises a plurality of layers generated from the image data, as described above. In some implementations, the plurality of layers are deep learning model layers generated from a deep learning model that is being applied to image data. In some implementations, the analysis comprises a plurality of layers generated from the image data.

As further shown in FIG. 6, process 600 may include determining attributions of each layer to a prediction based on the analysis of the image data (block 630). For example, the image analysis platform may determine attributions of each layer to a prediction based on the analysis of the image data, as described above.

As further shown in FIG. 6, process 600 may include determining structural similarities between image pairs associated with sets of layers of the plurality of layers, wherein the structural similarities are based on the attributions (block 640). For example, the image analysis platform may determine structural similarities between image pairs associated with sets of layers of the plurality of layers, wherein the structural similarities are based on the attributions, as described above. In some implementations, the structural similarities are based on the attributions.

As further shown in FIG. 6, process 600 may include analyzing the structural similarities to determine an assessment of the prediction performed using the computer vision model (block 650). For example, the image analysis platform may analyze the structural similarities to determine an assessment of the prediction performed using the computer vision model, as described above.

As further shown in FIG. 6, process 600 may include providing an output associated with identifying the assessment of the prediction (block 660). For example, the image analysis platform may provide an output associated with identifying the assessment of the prediction, as described above.

Process 600 may include additional implementations, such as any single implementation or any combination of implementations described below and/or in connection with one or more other processes described elsewhere herein.

In a first implementation, analyzing the structural similarities comprises generating the assessment for the prediction.

In a second implementation, alone or in combination with the first implementation, the structural similarities are included in a structural similarity matrix, and wherein generating the assessment comprises generating the assessment based on the structural similarity matrix.

In a third implementation, alone or in combination with one or more of the first and second implementations, process 600 includes determining that a score associated with the assessment does not satisfy a threshold, and retraining the computer vision model based on determining that the score associated with the assessment does not satisfy the threshold.

In a fourth implementation, alone or in combination with one or more of the first through third implementations, process 600 includes determining a fused attribution based on the structural similarities, and wherein providing the output comprises providing information identifying the fused attribution.

In a fifth implementation, alone or in combination with one or more of the first through fourth implementations, determining the attributions comprises generating, for a particular layer, an attribution score representing a contribution of the particular layer to the prediction based on individual contributions of each pixel in the particular layer to the prediction.

In a sixth implementation, alone or in combination with one or more of the first through fifth implementations, providing the output comprises providing information identifying a ranking of attribution scores of the plurality of layers.

In a seventh implementation, alone or in combination with one or more of the first through sixth implementations, determining the attributions comprises identifying that a subset of the plurality of layers satisfy a similarity score threshold based on pixels of the subset of the plurality of layers, and merging, based on identifying that the subset of the plurality of layers satisfy the similarity score threshold, the subset of the plurality of layers to generate a merged attribution score representing a contribution of the subset of layers to the prediction.

In an eighth implementation, alone or in combination with one or more of the first through seventh implementations, the computer vision model is a deep learning model or an explainable artificial intelligence model.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

Figure 7:
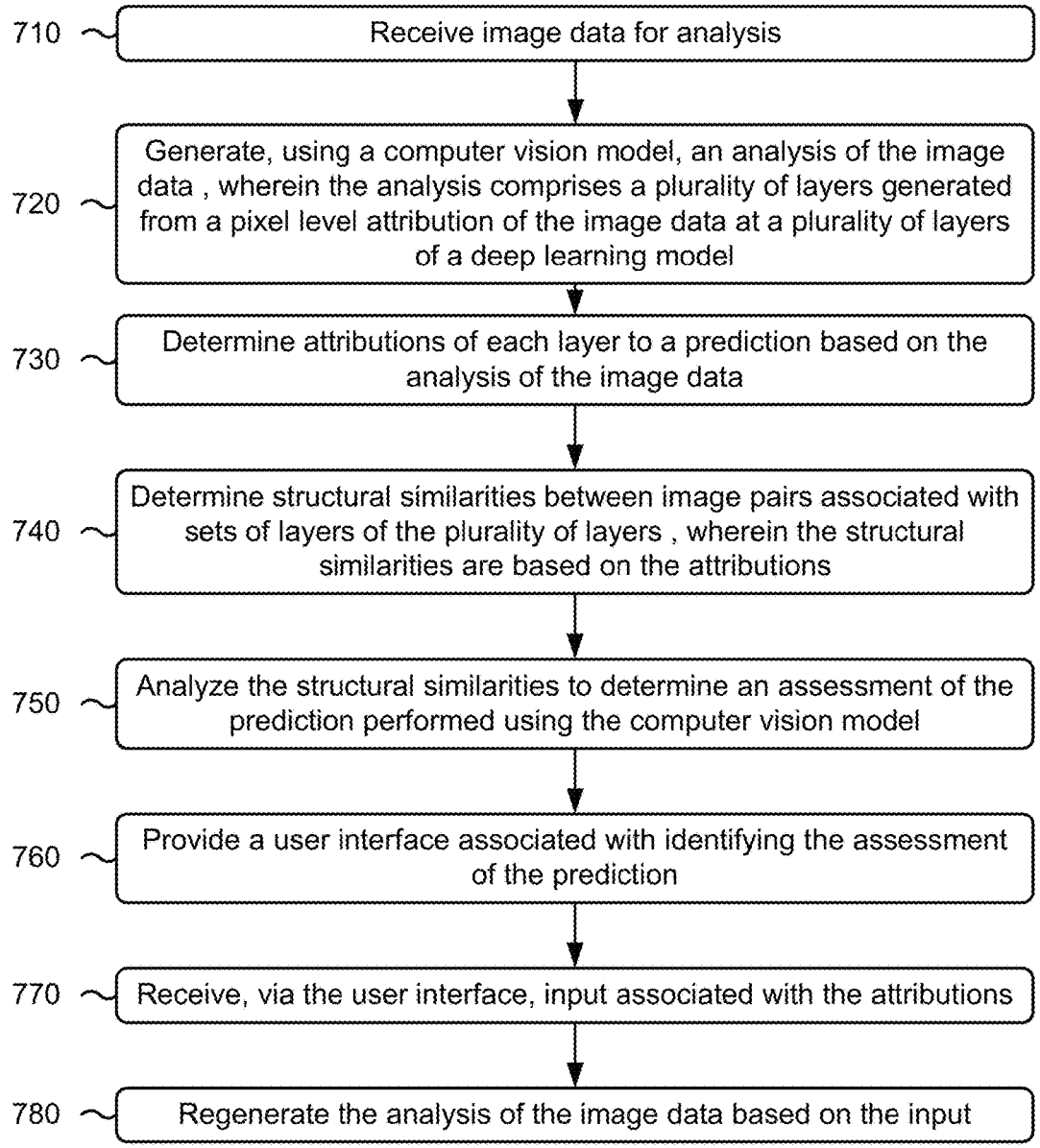

FIG. 7 is a flowchart of an example process 700 associated with layer-wise attribution image analysis. In some implementations, one or more process blocks of FIG. 7 are performed by a device (e.g., image analysis platform 401). In some implementations, one or more process blocks of FIG. 7 are performed by another device or a group of devices separate from or including the device, such as an image source device (e.g., image source device 430) and/or a client device (e.g., client device 440). Additionally, or alternatively, one or more process blocks of FIG. 7 may be performed by one or more components of device 500, such as processor 520, memory 530, input component 540, output component 550, and/or communication component 560.

As shown in FIG. 7, process 700 may include receiving image data for analysis (block 710). For example, the device may receive image data for analysis, as described above.

As further shown in FIG. 7, process 700 may include generating, using a computer vision model, an analysis of the image data, wherein the analysis comprises a plurality of layers generated from a pixel level attribution of the image data at a plurality of layers of a deep learning model (block 720). For example, the device may generate, using a computer vision model, an analysis of the image data, wherein the analysis comprises a plurality of layers generated from the image data, as described above. In some implementations, the analysis comprises a plurality of layers generated from the image data. For example, the analysis includes a plurality of layers of a deep learning model applied to the image data.

As further shown in FIG. 7, process 700 may include determining attributions of each layer to a prediction based on the analysis of the image data (block 730). For example, the device may determine attributions of each layer to a prediction based on the analysis of the image data, as described above.

As further shown in FIG. 7, process 700 may include determining structural similarities between image pairs associated with sets of layers of the plurality of layers, wherein the structural similarities are based on the attributions (block 740). For example, the device may determine structural similarities between image pairs associated with sets of layers of the plurality of layers, wherein the structural similarities are based on the attributions, as described above. In some implementations, the structural similarities are based on the attributions.

As further shown in FIG. 7, process 700 may include analyzing the structural similarities to determine an assessment of the prediction performed using the computer vision model (block 750). For example, the device may analyze the structural similarities to determine an assessment of the prediction performed using the computer vision model, as described above.

As further shown in FIG. 7, process 700 may include providing a user interface associated with identifying the assessment of the prediction (block 760). For example, the device may provide a user interface associated with identifying the assessment of the prediction, as described above.

As further shown in FIG. 7, process 700 may include receiving, via the user interface, input associated with the attributions (block 770). For example, the device may receive, via the user interface, input associated with the attributions, as described above.

As further shown in FIG. 7, process 700 may include regenerating the analysis of the image data based on the input (block 780). For example, the device may regenerate the analysis of the image data based on the input, as described above.

Process 700 may include additional implementations, such as any single implementation or any combination of implementations described below and/or in connection with one or more other processes described elsewhere herein.

In a first implementation, the input includes a selection of a subset of layers for exclusion from the analysis of the image data, and wherein the one or more processors, when regenerating the analysis of the image data, are configured to regenerating the analysis of the image data with pixels of the subset of layers excluded from the analysis of the image data.

In a second implementation, alone or in combination with the first implementation, the input includes a selection of a subset of layers for inclusion in the analysis of the image data, and wherein the one or more processors, when regenerating the analysis of the image data, are configured to regenerating the analysis of the image data with pixels of the subset of layers included in the analysis of the image data.

In a third implementation, alone or in combination with one or more of the first and second implementations, the user interface includes a visualization of one or more layers, of the plurality of layers, and wherein the visualization includes visual information identifying one or more attributions of the one or more layers.

In a fourth implementation, alone or in combination with one or more of the first through third implementations, the visualization is a heat map.

In a fifth implementation, alone or in combination with one or more of the first through fourth implementations, the prediction includes an object recognition prediction or a diagnostic prediction.

Although FIG. 7 shows example blocks of process 700, in some implementations, process 700 includes additional blocks, fewer blocks, different blocks, or differently arranged blocks than those depicted in FIG. 7. Additionally, or alternatively, two or more of the blocks of process 700 may be performed in parallel.

Figure 8:
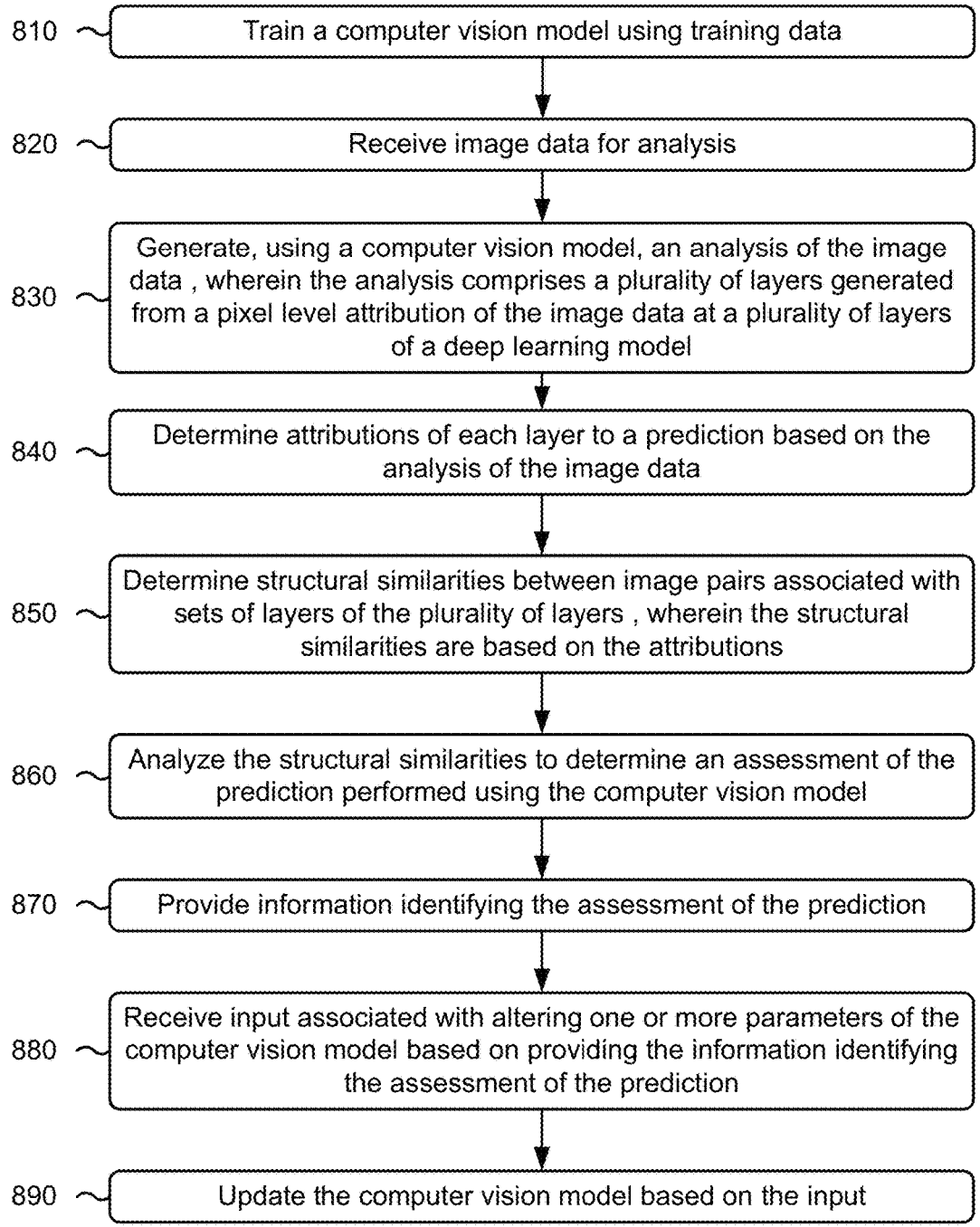

FIG. 8 is a flowchart of an example process 800 associated with layer-wise attribution image analysis. In some implementations, one or more process blocks of FIG. 8 are performed by a device (e.g., image analysis platform 401). In some implementations, one or more process blocks of FIG. 8 are performed by another device or a group of devices separate from or including the device, such as an image source device (e.g., image source device 430) and/or a client device (e.g., client device 440). Additionally, or alternatively, one or more process blocks of FIG. 8 may be performed by one or more components of device 500, such as processor 520, memory 530, input component 540, output component 550, and/or communication component 560.

As shown in FIG. 8, process 800 may include training a computer vision model using training data (block 810). For example, the device may train a computer vision model using training data, as described above.

As further shown in FIG. 8, process 800 may include receiving image data for analysis (block 820). For example, the device may receive image data for analysis, as described above.

As further shown in FIG. 8, process 800 may include generating, using a computer vision model, an analysis of the image data, wherein the analysis comprises a plurality of layers generated from a pixel level attribution of the image data at a plurality of layers of a deep learning model (block 830). For example, the device may generate, using a computer vision model, an analysis of the image data, wherein the analysis comprises a plurality of layers generated from the image data, as described above. In some implementations, the analysis comprises a plurality of layers generated from the image data. For example, the plurality of layers may be layers of a deep learning model being applied to the image data.

As further shown in FIG. 8, process 800 may include determining attributions of each layer to a prediction based on the analysis of the image data (block 840). For example, the device may determine attributions of each layer to a prediction based on the analysis of the image data, as described above.

As further shown in FIG. 8, process 800 may include determining structural similarities between image pairs associated with sets of layers of the plurality of layers, wherein the structural similarities are based on the attributions (block 850). For example, the device may determine structural similarities between image pairs associated with sets of layers of the plurality of layers, wherein the structural similarities are based on the attributions, as described above. In some implementations, the structural similarities are based on the attributions.

As further shown in FIG. 8, process 800 may include analyzing the structural similarities to determine an assessment of the prediction performed using the computer vision model (block 860). For example, the device may analyze the structural similarities to determine an assessment of the prediction performed using the computer vision model, as described above.

As further shown in FIG. 8, process 800 may include providing information identifying the assessment of the prediction (block 870). For example, the device may provide information identifying the assessment of the prediction, as described above.

As further shown in FIG. 8, process 800 may include receiving input associated with altering one or more parameters of the computer vision model based on providing the information identifying the assessment of the prediction (block 880). For example, the device may receive input associated with altering one or more parameters of the computer vision model based on providing the information identifying the assessment of the prediction, as described above.

As further shown in FIG. 8, process 800 may include updating the computer vision model based on the input (block 890). For example, the device may update the computer vision model based on the input, as described above.

Process 800 may include additional implementations, such as any single implementation or any combination of implementations described below and/or in connection with one or more other processes described elsewhere herein.

In a first implementation, process 800 includes determining, for each layer of the plurality of layers, a uniqueness metric relating to the prediction, and wherein the one or more instructions, that cause the device to provide the information identifying the assessment of the prediction, cause the device to providing information identifying the uniqueness metric.

In a second implementation, alone or in combination with the first implementation, process 800 includes providing information identifying a subset of layers, of the plurality of layers, with a corresponding uniqueness metric satisfying a threshold.

In a third implementation, alone or in combination with one or more of the first and second implementations, process 800 includes altering the computer vision model based on the corresponding uniqueness metric.

In a fourth implementation, alone or in combination with one or more of the first through third implementations, process 800 includes excluding one or more layers from the computer vision model for which a corresponding uniqueness metric does not satisfy the threshold.

Although FIG. 8 shows example blocks of process 800, in some implementations, process 800 includes additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by an image analysis platform, image data for analysis;
generating, by the image analysis platform and using a computer vision model, an analysis of the image data, wherein the analysis comprises a plurality of layers generated from a pixel level attribution of the image data at the plurality of layers of the computer vision model;
determining, by the image analysis platform, attributions of each layer to a prediction based on the analysis of the image data;
transforming, by the image analysis platform, the determined attributions of each layer into attribution images that has a same size as an original image of the image data, wherein the attribution images have different spatial dimensions;
converting, by the image analysis platform, the attribution images having a common spatial dimension to enable calculation of structural similarities;
determining, by the image analysis platform, the structural similarities between image pairs associated with sets of layers of the plurality of layers,
wherein the structural similarities are based on the attributions;
analyzing, by the image analysis platform, the structural similarities to determine an assessment of the prediction performed using the computer vision model; and
providing, by the image analysis platform, an output associated with identifying the assessment of the prediction.

2. The method of claim 1, wherein analyzing the structural similarities comprises: generating the assessment for the prediction.

3. The method of claim 2, wherein the structural similarities are included in a structural similarity matrix; and
wherein generating the assessment comprises:
generating the assessment based on the structural similarity matrix.

4. The method of claim 3, further comprising:
determining that a score associated with the assessment does not satisfy a threshold; and
retraining the computer vision model based on determining that the score associated with the assessment does not satisfy the threshold.

5. The method of claim 1, further comprising:
determining a fused attribution based on the structural similarities; and
wherein providing the output comprises:
providing information identifying the fused attribution.

6. The method of claim 1, wherein determining the attributions comprises:
generating, for a particular layer, an attribution score representing a contribution of the particular layer to the prediction based on individual contributions of each pixel in the particular layer to the prediction.

7. The method of claim 6, wherein providing the output comprises:
providing information identifying a ranking of attribution scores of the plurality of layers.

8. The method of claim 6, wherein determining the attributions comprises:
identifying that a subset of the plurality of layers satisfy a similarity score threshold based on pixels of the subset of the plurality of layers; and
merging, based on identifying that the subset of the plurality of layers satisfy the similarity score threshold, the subset of the plurality of layers to generate a merged attribution score representing a contribution of the subset of layers to the prediction.

9. The method of claim 1, wherein the computer vision model is a deep learning model or an explainable artificial intelligence model.

10. A device, comprising:
one or more memories; and
one or more processors, communicatively coupled to the one or more memories, configured to:
receive image data for analysis;
generate, using a computer vision model, an analysis of the image data,
wherein the analysis comprises a plurality of layers generated from the image data;
determine attributions of each layer to a prediction based on the analysis of the image data;
transform the determined attributions of each layer into attribution images that has a same size as an original image of the image data, wherein the attribution images have different spatial dimensions;
convert the attribution images having a common spatial dimension to enable calculation of structural similarities;
determine the structural similarities between image pairs associated with sets of layers of the plurality of layers,
wherein the structural similarities are based on the attributions;
analyze the structural similarities to determine an assessment of the prediction performed using the computer vision model; and
provide a user interface associated with identifying the assessment of the prediction;
receive, via the user interface, input associated with the attributions; and
regenerate the analysis of the image data based on the input.

11. The device of claim 10, wherein the input includes a selection of a subset of layers for exclusion from the analysis of the image data; and
wherein the one or more processors, when regenerating the analysis of the image data, are configured to:
regenerate the analysis of the image data with pixels of the subset of layers excluded from the analysis of the image data.

12. The device of claim 10, wherein the input includes a selection of a subset of layers for inclusion in the analysis of the image data; and
wherein the one or more processors, when regenerating the analysis of the image data, are configured to:
regenerate the analysis of the image data with pixels of the subset of layers included in the analysis of the image data.

13. The device of claim 12, wherein the user interface includes a visualization of one or more layers, of the plurality of layers, and
wherein the visualization includes visual information identifying one or more attributions of the one or more layers.

14. The device of claim 13, wherein the visualization is a heat map.

15. The device of claim 10, wherein the prediction includes an object recognition prediction or a diagnostic prediction.

16. A non-transitory computer-readable medium storing a set of instructions, the set of instructions comprising:
one or more instructions that, when executed by one or more processors of a device, cause the device to:
train a computer vision model using training data;
receive image data for analysis;
generate, using a computer vision model, an analysis of the image data,
wherein the analysis comprises a plurality of layers generated from the image data;
determine attributions of each layer to a prediction based on the analysis of the image data;
transform the determined attributions of each layer into attribution images that has a same size as an original image of the image data, wherein the attribution images have different spatial dimensions;
convert the attribution images having a common spatial dimension to enable calculation of structural similarities;
determine the structural similarities between image pairs associated with sets of layers of the plurality of layers,
wherein the structural similarities are based on the attributions;
analyze the structural similarities to determine an assessment of the prediction performed using the computer vision model; and
provide information identifying the assessment of the prediction;
receive input associated with altering one or more parameters of the computer vision model based on providing the information identifying the assessment of the prediction; and
update the computer vision model based on the input.

17. The non-transitory computer-readable medium of claim 16, wherein the one or more instructions, when executed by the one or more processors, further cause the device to:
determining, for each layer of the plurality of layers, a uniqueness metric relating to the prediction; and
wherein the one or more instructions, that cause the device to provide the information identifying the assessment of the prediction, cause the device to:
provide information identifying the uniqueness metric.

18. The non-transitory computer-readable medium of claim 17, wherein the one or more instructions, that cause the device to provide the information identifying the uniqueness metric, cause the device to:
provide information identifying a subset of layers, of the plurality of layers, with a corresponding uniqueness metric satisfying a threshold.

19. The non-transitory computer-readable medium of claim 18, wherein the one or more instructions, when executed by the one or more processors, further cause the device to:
altering the computer vision model based on the corresponding uniqueness metric.

20. The non-transitory computer-readable medium of claim 19, wherein the one or more instructions, that cause the device to alter the computer vision model, cause the device to:
exclude one or more layers from the computer vision model for which a corresponding uniqueness metric does not satisfy the threshold.

* * * * *